(12) United States Patent
Priel et al.

(10) Patent No.: US 8,245,068 B2
(45) Date of Patent: Aug. 14, 2012

(54) POWER SUPPLY MONITORING METHOD AND SYSTEM

(75) Inventors: Michael Priel, Hertzelia (IL); Asaf Ashkenazi, Austin, TX (US); Dan Kuzmin, Givat Shmuel (IL)

(73) Assignee: Freescale Semiconductor, Inc., Austin, TX (US)

( * ) Notice: Subject to any disclaimer, the term of this patent is extended or adjusted under 35 U.S.C. 154(b) by 424 days.

(21) Appl. No.: 12/447,395

(22) PCT Filed: Oct. 27, 2006

(86) PCT No.: PCT/IB2006/053968
§ 371 (c)(1),
(2), (4) Date: Apr. 27, 2009

(87) PCT Pub. No.: WO2008/050180
PCT Pub. Date: May 2, 2008

(65) Prior Publication Data
US 2010/0070791 A1    Mar. 18, 2010

(51) Int. Cl.
*G06F 1/14* (2006.01)
*G06F 1/30* (2006.01)
(52) U.S. Cl. .................. 713/340; 713/500; 713/502
(58) Field of Classification Search ................... None
See application file for complete search history.

(56) References Cited

U.S. PATENT DOCUMENTS

| | | | |
|---|---|---|---|
| 5,577,220 A * | 11/1996 | Combs et al. ............... | 711/206 |
| 5,596,512 A | 1/1997 | Wong et al. | |
| 5,920,727 A | 7/1999 | Kikinis et al. | |
| 6,351,220 B1 * | 2/2002 | Gunther et al. ............... | 60/796 |
| 6,814,297 B2 | 11/2004 | Mueller | |
| 2002/0083284 A1 | 6/2002 | Matsubara et al. | |
| 2004/0128528 A1 | 7/2004 | Poisner | |
| 2004/0225439 A1 | 11/2004 | Gronemeyer | |
| 2005/0218939 A1 | 10/2005 | Ma | |
| 2006/0007616 A1 | 1/2006 | Pan et al. | |

FOREIGN PATENT DOCUMENTS

JP        59109876       6/1984

OTHER PUBLICATIONS

PCT Appl. No. PCT/IB2006/053968 Search Report and Written Opinion.

* cited by examiner

*Primary Examiner* — Dennis M Butler

(57) ABSTRACT

A device having a power supply monitoring capabilities, the device includes: a power supply unit; at least one real time clock generator counter adapted to receive a supply voltage from the power supply unit; a fixed value storage circuit that is un-accessible to software executed by a processor; wherein the fixed value storage circuit stores a fixed value; wherein the fixed value includes multiple bits; a volatile storage unit, being accessible to the processor; wherein the volatile storage unit is adapted to: (i) store a reset value after being reset; (ii) receive the fixed value during an initialization state; and (iii) store the fixed value until being reset; wherein the volatile storage unit is designed such that there is a low probability that the reset value equals the fixed value; and a comparator adapted to provide a tamper indication if the fixed value stored at the fixed value storage circuit differs from a value stored at the volatile storage unit.

20 Claims, 6 Drawing Sheets

POWER SUPPLY MONITORING METHOD AND SYSTEM

FIELD OF THE INVENTION

The present invention relates to methods for power supply monitoring and for devices having power supply monitoring capabilities.

BACKGROUND OF THE INVENTION

Real time clock generators have various applications. They can be used for providing timing information for operating systems, for enforcing policies for time-sensitive data, for assisting in positioning calculations and the like. U.S patent application serial number 2002/0083284 of Matsubara et al., titled "Data reproduction system, data recorder and data reader preventing fraudulent usage by monitoring reproducible time limit", U.S. Pat. No. 5,920,727 of Kikinis et al., titled "Timer-controlled computer system shutdown and startup", U.S patent application serial number 2004/0128528 of Poisner titled "Trusted real time clock" and U.S patent application serial number 2004/0225439 of Gronemeyer, titled "Method and apparatus for real time clock (RTC) brownout detection, all being incorporated herein by reference, illustrate some usages of real time clocks.

Real time clock signals can be tampered for various reasons including copyrighting piracy, concealing hacking or tampering attempts, reducing the functionality of a device and the like.

One tampering method involves repetitive alterations of the power supply level provided to the real time clock generator, in order to force the real time clock generator to reset or to get stuck.

There is a need to provide efficient methods and devices for performing voltage supply monitoring.

SUMMARY OF THE PRESENT INVENTION

A device and a method for monitoring power supply and devices having power supply monitoring capabilities, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Embodiments of the present invention illustrated in the accompanying drawings provide an information processing apparatus such as a mobile phone, a personal data accessory or a media player that includes a device that is capable of monitoring a power supply provided to a real time clock.

By comparing between a fixed value stored in a fixed value storage circuit and between a value stored in a volatile storage unit an indication about a voltage supply drop or supply unit failure can be generated. The fixed value storage circuit can be a one time programmable circuit that is set during a configuration of the integrated circuit, or can be a circuit that is defined by the mask of the integrated circuit. The fixed value can be set per each integrated circuit or can be set per multiple integrated circuits (for example per an integrated circuit batch).

Conveniently, a device is provided. The device includes: (i) a power supply unit; (ii) at least one real time clock generator counter adapted to receive a supply voltage from the power supply unit; (iii) a fixed value storage circuit that is un-accessible to software executed by a processor; wherein the first fixed value storage circuit stores a fixed value; wherein the fixed value includes multiple bits; (iv) a volatile storage unit, being accessible to the processor; wherein the volatile storage unit is adapted to: store a reset value after being reset; receive the fixed value during an initialization state; and store the fixed value until being reset; wherein the volatile storage unit is designed such that there is a low probability that the reset value equals the fixed value; and (v) a comparator adapted to provide a tamper indication if the fixed value stored at the fixed value storage circuit differs from a value stored at the volatile storage unit.

A method for power supply monitoring is provided. The method includes: (i) storing 310 a fixed value at a fixed value storage circuit that is un-accessible to software executed by a processor; wherein the fixed value includes multiple bits; (ii) providing a supply voltage to a real time clock generator counter; (iii) providing to a volatile storage unit, during an initialization stage, the fixed value; wherein the volatile storage unit is accessible to the processor; and (iv) storing the fixed value at the volatile storage unit, until being reset; wherein the volatile storage unit is designed such that there is a low probability that the reset value equals the fixed value; and (v) generating a tamper indication if the fixed value stored at the fixed value storage circuit differs from a value stored at the volatile storage unit.

Figure 1:
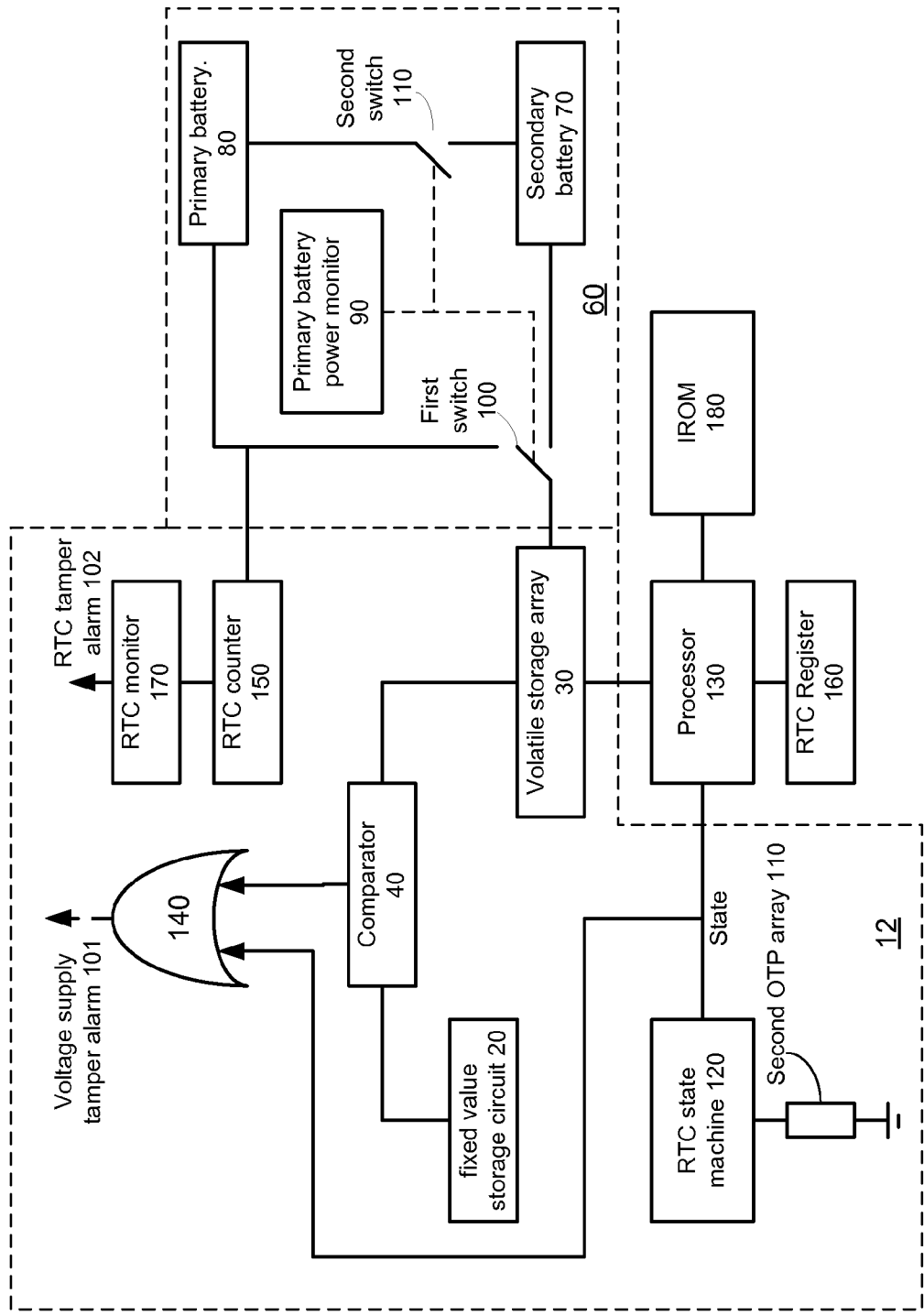
FIG. 1 illustrates a device having power supply monitoring capabilities according to an embodiment of the invention.

FIG. 1 illustrates device 10 having power supply monitoring capabilities according to an embodiment of the invention. Device 10 is an information processing apparatus and can be a mobile device such as but not limited to laptop computer, a mobile phone, a media player, a mobile game console and the like. Device 10 can also be a stationary apparatus such as a desktop computer, a plasma screen, a television, a media entertainment system, a security/monitoring system, a stationary game console and the like. Device 10 can include one or more displays, processors, memory units, loudspeakers, microphones, DMA controllers, and the like. Device 10 can include one or more integrated circuits.

Device 10 includes a power supply unit 60 that supplied a voltage supply to various components of device 10. Some components (such as processor 130) receive a supply voltage during non-idle modes while other components (such as volatile storage unit 30) can receive a supply voltage in a constant uninterrupted manner.

Conveniently, processor 130 can be powered by primary battery 80 of power supply unit 60 while volatile storage unit 30 can receive a supply voltage from primary battery 80 or from secondary battery 70, in response to the state of primary battery 80.

Volatile storage unit 30 is connected between processor 130 and comparator 40. Processor 130 is also connected to instruction read only memory unit (IROM) 180, to real time clock registers (RTC register) 160. FIG. 1 also illustrates a real time clock state machine 120 that can be implemented by software executed by processor 130 or by another component. Processor 130 is illustrated as being connected to RTC state machine 120 although this link can be a virtual link.

RTC state machine is connected to second one time programmable (OTP) array 110 that indicate the security mode (out of a plurality of security modes) of real time clock generator 12. There are three security modes—high security mode, medium security mode and low security mode. These modes will be further illustrated in reference to FIG. 2-FIG. 4. It is noted that the number of security modes can differ from three.

Conveniently, the security modes differ from each other by a security condition that if fulfilled allows writing a fixed value to volatile storage unit 30. A fixed value storage circuit 20 stores the fixed value while the volatile storage unit 30 can store the fixed value or a reset value. The reset value usually differs from the fixed value. Conveniently, during a high security mode the fixed value is written to volatile storage unit 30 under a control of a code fetched from IROM 180 that is accessible to processor 130.

Conveniently, during a medium security mode the fixed value is written to volatile storage unit 30 under a control of a secure software executed by the processor 130. A secure software can be executed by processor 130 during a supervisor more or any high security level execution mode indicated by a hard signal from the processor to the real time clock.

Figure 5:
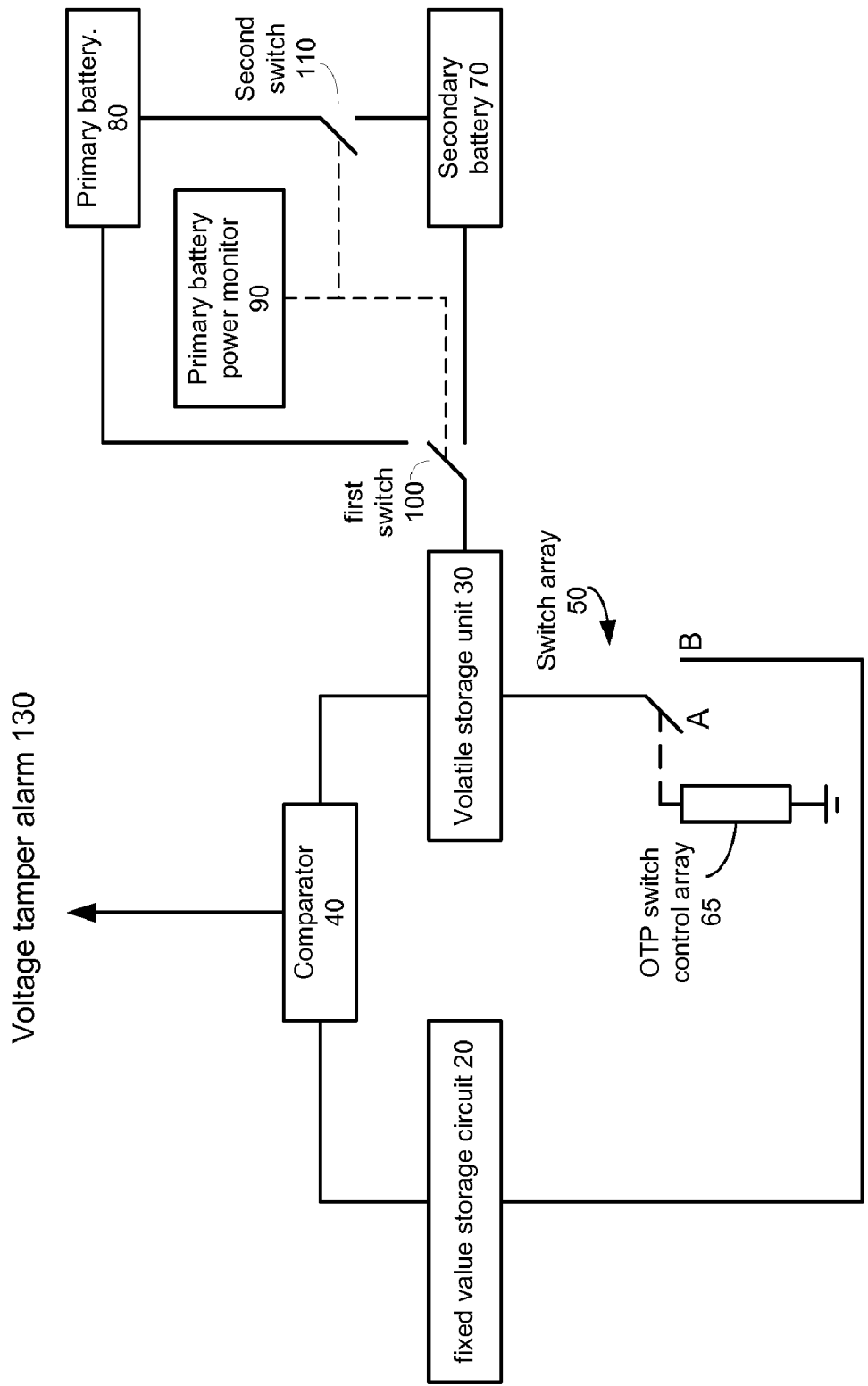
FIG. 5 illustrates a device having power supply monitoring capabilities according to another embodiment of the invention.

According to an embodiment of the invention the fixed value is written to the volatile storage unit 30 only once during a lifetime of the device. Thus, if both primary and secondary batteries 80 and 70 are empty the device 10 will be disabled. Such a configuration is illustrated in FIG. 5.

Device 10 and especially volatile storage unit 30 are designed such that there is only a very small chance that the reset value of volatile storage unit 30 will equal the fixed value. It is noted that the reset value can differ from one reset to another and that it can be determined in a random or semi-random manner. It is further notes that the fixed value includes multiple digits.

For example, first volatile storage unit 30 may includes multiple flip flops that are not connected to a power on reset signal and are not reset during power drops. After a power drop occurs the value stored in volatile storage unit 30 can be random or can be set by pull up and alternatively or additionally, pull down circuits. When pull up or pull down circuits are used the writing process should be designed such as to allow overwriting the values that are forced by the pull up or the pull down circuits. For example, first volatile storage unit 20 can includes multiple flip flops that have inputs that are "open" after device 10 recovers from a reset situation. Yet for another example, volatile storage unit 30 can includes multiple flip-flops that have a tendency to have a certain reset value. This can be achieved by using stronger NMOS transistors or stronger PMOS transistors.

Comparator 40 compares between the fixed value stored at fixed value storage circuit 20 and between the value (reset value or fixed value) stored at volatile storage unit 30. A voltage supply tamper alarm 101 can be generated if the fixed value stored at fixed value storage circuit 20 differs from the value (reset value or fixed value) stored at volatile storage unit 30. According to an embodiment of the invention, illustrated in FIG. 2, the voltage supply tamper alarm 101 will be generated if these mentioned above values differ from each other and if the real time clock generator is in a certain state. This is illustrated by OR gate 140 that receives the output of comparator 40 and also receives a state indication from RTC state machine 120.

Real time clock generator 12 also includes at least one real time clock counter 150 and a real time clock monitor 170. Real time clock monitor 170 can monitors the real time clock signal outputted by real time clock counter 150, for example by monitoring the DC level of the real time clock signal, by measuring the frequency of the real time clock signal and the like. Real time clock monitor 170 can be adapted to determine the frequency of a real time clock signal, during a short monitoring period and conveniently during a single real time clock cycle. It can include a sampling circuit that samples the real time clock signal during multiple points in time during one (or few) real time clock cycles. It can include a high frequency oscillator that is connected to a counter whereas the number of oscillations during one or few real time clock cycles indicates the frequency of the real time clock signal.

It is further notes that is a real time clock failure is detected (for example real time clock tamper alarm 102 or voltage supply tamper alarm 101 were generated than a failure indication can be stored at real time clock register 160.

Power supply unit 60 includes primary battery 80, secondary battery 70, primary battery power monitor 90, first switch 100 and second switch 110. Primary battery power monitor 90 monitors primary battery 80 and while the primary battery 80 is full enough it allows volatile storage unit 30 and secondary battery 70 to be powered by primary battery. It is implemented by closing second switch 110 and connecting volatile storage unit 30 to primary battery 80 via first switch 100. When the primary battery 80 is not full enough then primary battery power monitor 90 disconnects secondary battery 70 from primary battery 80 and connects secondary battery 70 to volatile storage unit 30.

Figure 2:
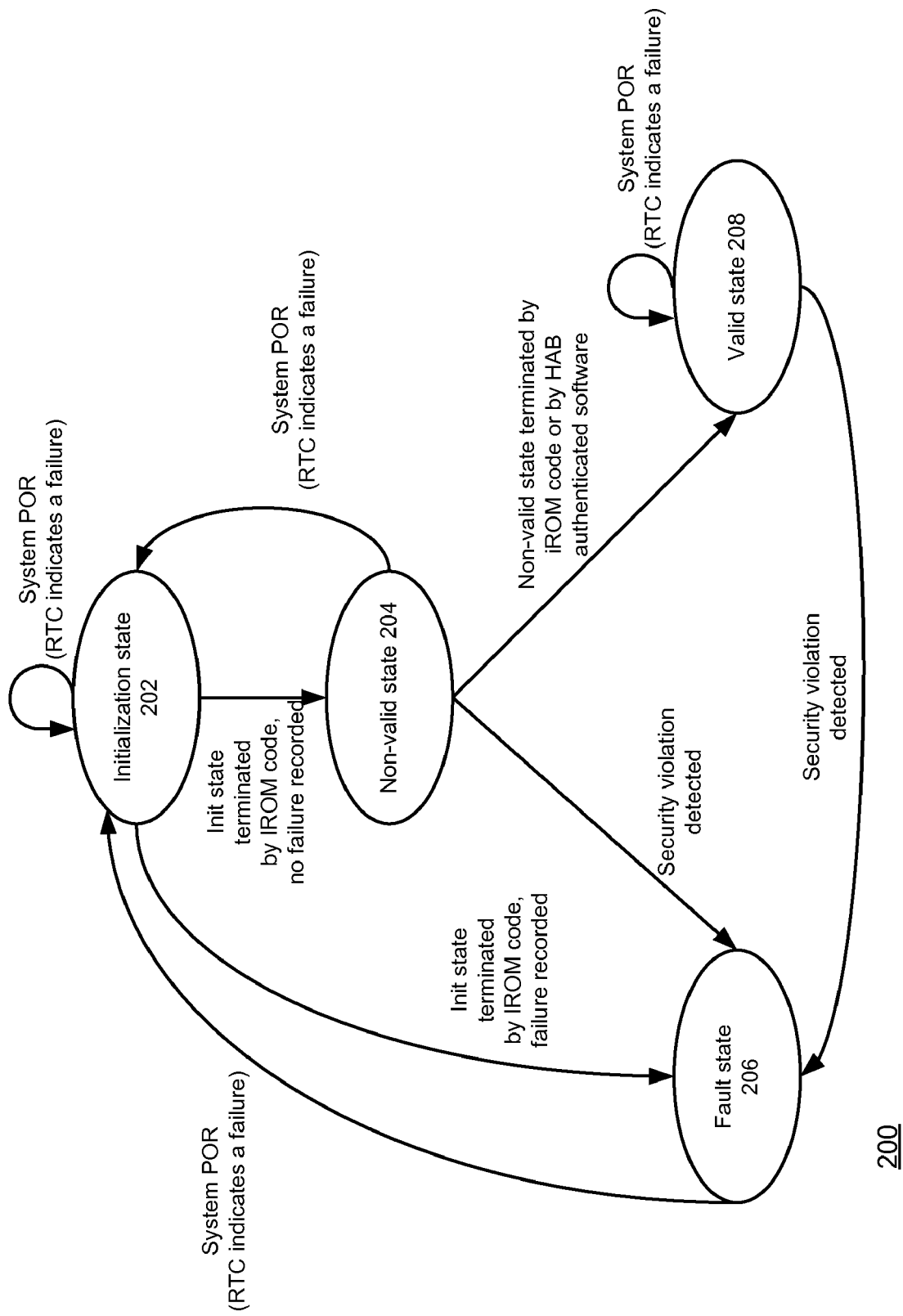
FIG. 2 illustrates a high security mode state diagram according to another embodiment of the invention.

FIG. 2 illustrates a high security mode state diagram 200 according to another embodiment of the invention.

State diagram 200 illustrates four states of RCT state machine 120: initialization state 202, non-valid state 204, valid state 208 and fault state 206. Real time clock generator 12 is in initialization state 202 after being powered for the first time or after device 10 is powered on reset (POR). During non-valid state 204 the real time clock counter 150 is not set and a real time clock signal outputted from this counter is regarded as invalid. During valid state 208 the real time clock generator counts time and the real time clock signal outputted from real time clock counter 150 is regarded as valid. Faults states 206 indicates that a failure (power supply failure, real time clock generator failure was detected).

During initialization state 202 a tamper protected software stored at IROM 180 or a software that authenticated by a tamper protected software stored at IROM 180 can write the fixed value to volatile storage unit 30. The HAB routine can also clear a failure record within real time clock register 160.

RTC can exit initialization state 202 in control of a code fetched from IROM 180 and executed by processor 130. If RTC register 160 stores a failure indication that state 202 is followed by fault state 206, else initialization state 202 is followed by non-valid state 204.

Valid state 208 can follow non-valid state 204 under the control of a code fetched from IROM 180 and executed by processor 130 or under the control of a HAB routine. Initialization state 204 and valid state 208 are followed by fault state 206 if a failure is detected. Fault state 206 is followed by initialization state when a power on reset occurs.

Figure 3:
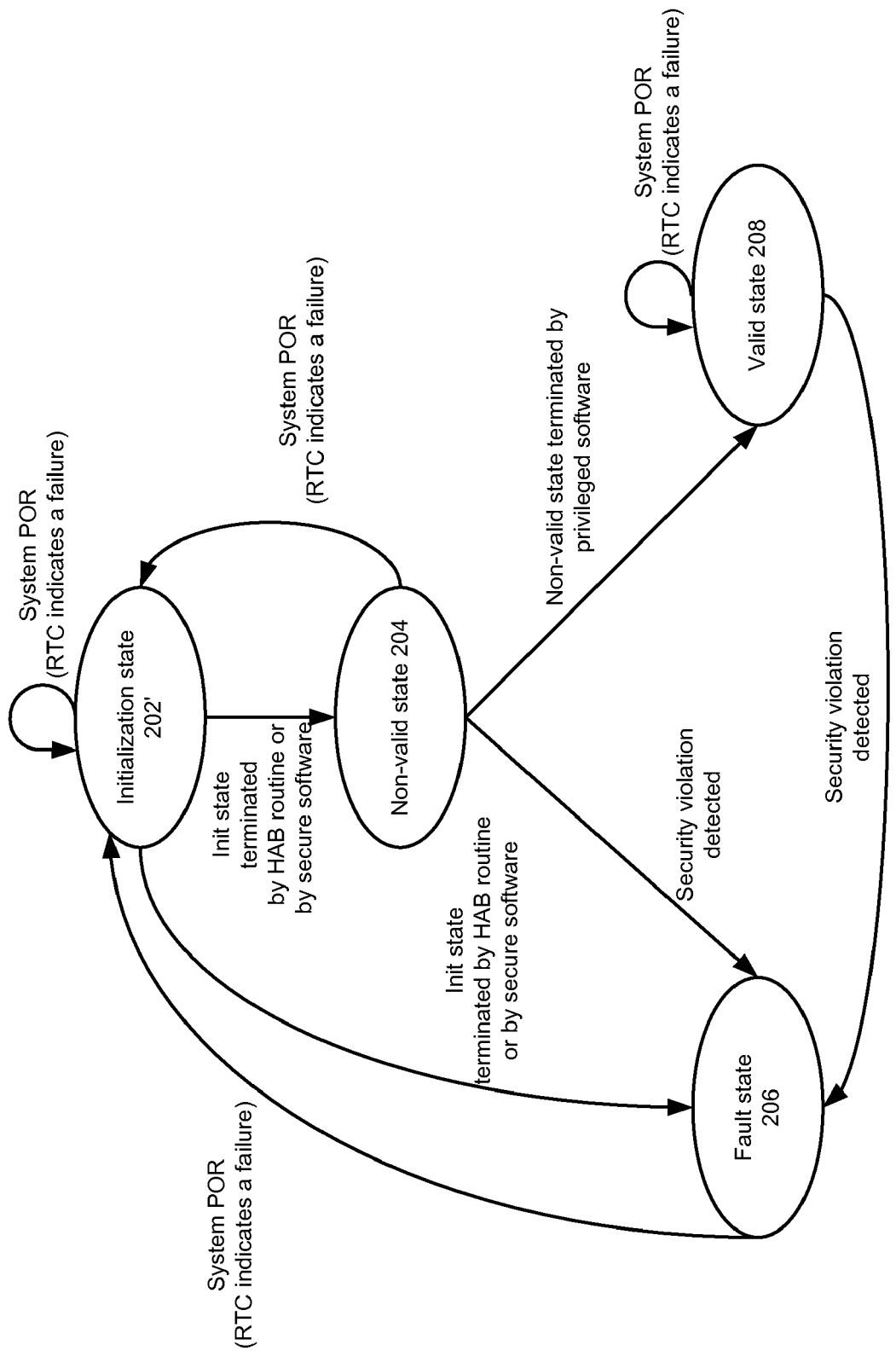
FIG. 3 illustrates a medium security mode state diagram according to another embodiment of the invention.

FIG. 3 illustrates a medium security mode state diagram 220 according to another embodiment of the invention.

State diagram 220 illustrates four states of RCT state machine 120: initialization state 202', non-valid state 204, valid state 208 and fault state 206.

During initialization state 202' the HAB routine or a secure software executed by processor 130 can write the fixed value to volatile storage unit 30 and can clear a failure record within real time clock register 160.

Valid state 208 can follow non-valid state 204 under the control of secure software executed by processor 130.

Figure 4:
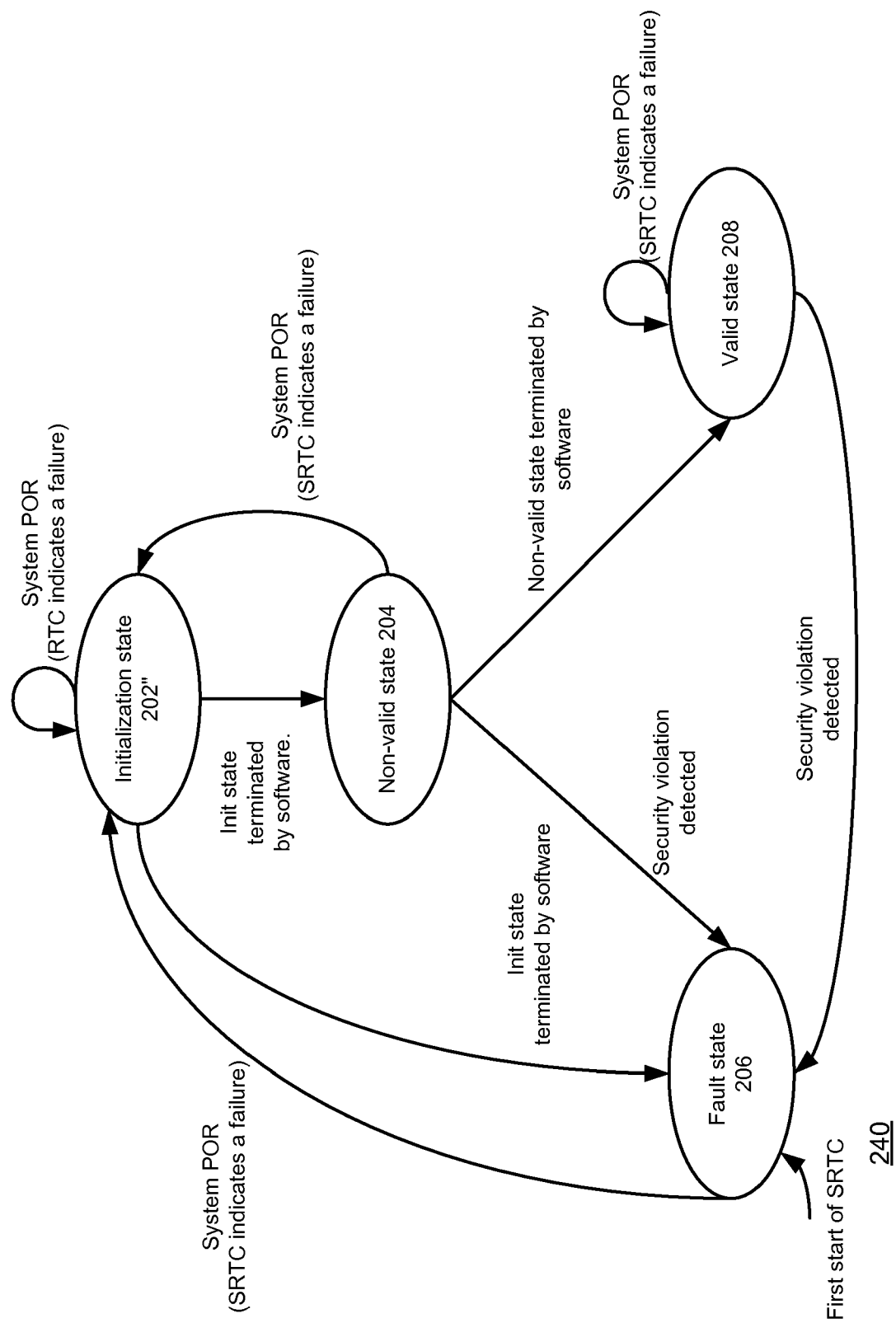
FIG. 4 illustrates a low security mode state diagram according to another embodiment of the invention.

FIG. 4 illustrates a low security mode state diagram 240 according to another embodiment of the invention.

State diagram 240 illustrates four states of RCT state machine 120: initialization state 202", non-valid state 204, valid state 208 and fault state 206.

During initialization state 202" even non-secure software executed by processor 130 can write the fixed value to volatile storage unit 30 and can clear a failure record within real time clock register 160.

Valid state 208 can follow non-valid state 204 even under the control of non-secure software executed by processor 130.

FIG. 5 illustrates device 11 having power supply monitoring capabilities according to another embodiment of the invention.

In device 11 the fixed value is written to volatile storage unit 30 (conveniently, by connecting volatile storage unit 30 to fixed value storage circuit 20) and the disconnecting the connection between fixed value storage circuit 20 and volatile storage unit 30. This can be done by altering a value stored in OTP switch array control 65 after the writing of the fixed value takes place. This alteration can be done by the manufacture of device 10, that can burn a fuse within OTP switch array control 60 such as to disconnect the volatile storage unit 30 from fixed value storage circuit 20 and to prevent future writing of the fixed value to volatile storage unit 30.

Figure 6:
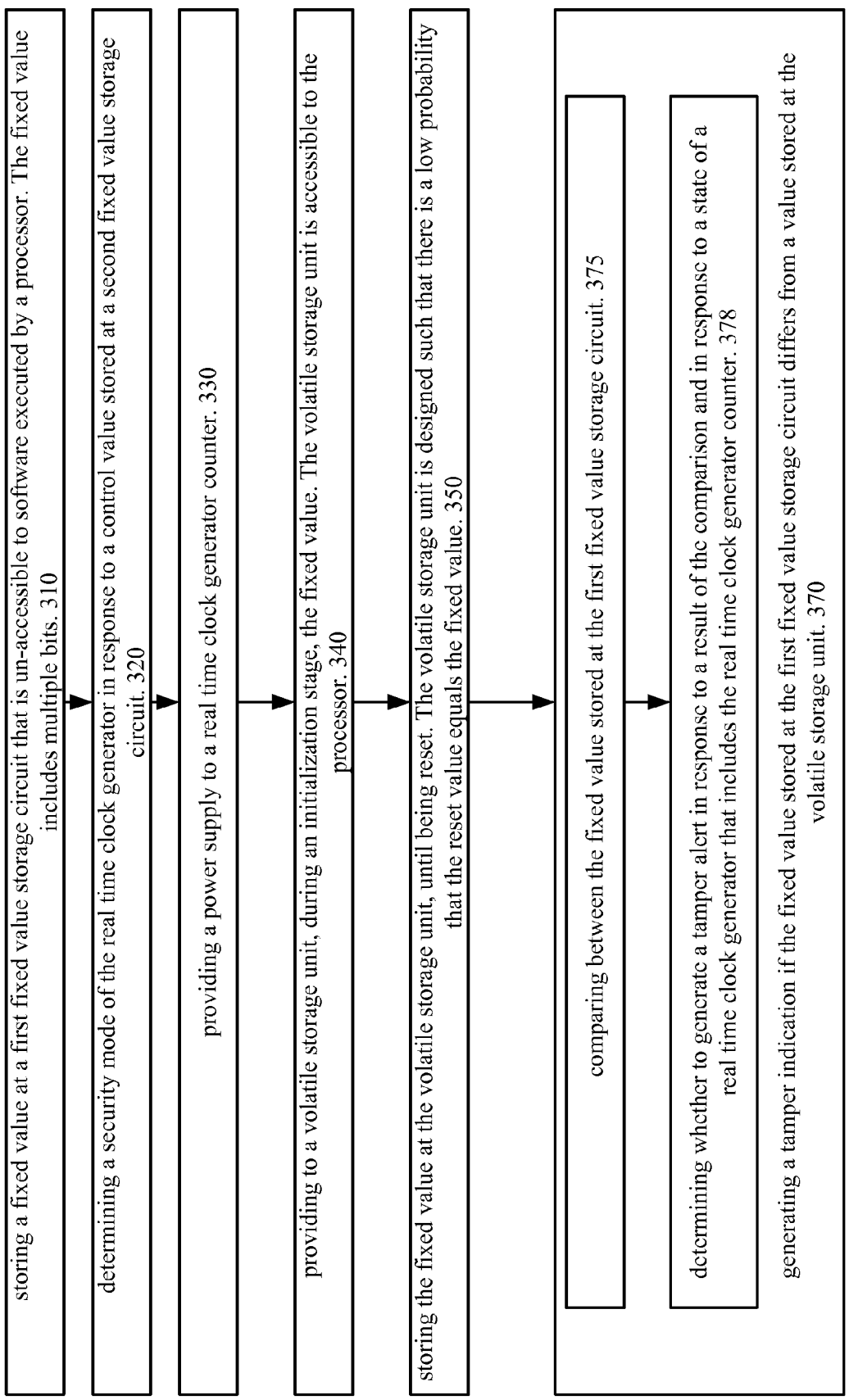
FIG. 6 illustrates a method for monitoring power supply according to an embodiment of the invention.

FIG. 6 illustrates method 300 for power supply monitoring, according to an embodiment of the invention.

Method 300 starts by storing 310 a fixed value at a fixed value storage circuit that is un-accessible to software executed by a processor. The fixed value includes multiple bits. It is noted that the first OTP can not be read by the processor.

Stage 310 is followed by stage 320 of determining a security mode of the real time clock generator in response to a control value stored at a second one time programmable array.

Stage 320 is followed by stage 330 of providing a power supply to a real time clock generator counter.

Conveniently, stage 330 includes providing a supply voltage to the volatile storage unit during idle mode of the processor.

Conveniently, stage 330 includes constantly providing a supply voltage to the volatile storage unit until both a primary battery and a secondary battery of a power supply unit are emptied.

Stage 330 is followed by stage 340 of providing to a volatile storage unit, during an initialization stage, the fixed value. The volatile storage unit is accessible to the processor.

Conveniently, stage 340 of providing is responsive to a fulfillment of a security condition. Conveniently, one security mode of the real time clock generator differs from another security mode of the real time clock generator by their associated security conditions.

According to various embodiments of the invention stage 340 of providing is controlled by one or more of the following: (i) a code fetched from an instruction read only memory unit accessible to the processor; (ii) a secure software executed by the processor; (iii) a HAB routine; (iv) a non-secure software program; or (v) a OTP switch control array.

According to another embodiment of the invention stage 340 is executed only once during a lifetime of the device.

Stage 340 is followed by stage 350 of storing the fixed value at the volatile storage unit, until being reset. The volatile storage unit is designed such that there is a low probability that the reset value equals the fixed value.

Stage 350 is followed by stage 370 of generating a tamper indication if the fixed value stored at the fixed value storage circuit differs from a value stored at the volatile storage unit. Conveniently, stage 370 includes stage 375 of comparing between the fixed value stored at the fixed value storage circuit.

Conveniently, stage 370 includes stage 378 of determining whether to generate a tamper alert in response to a result of the comparison and in response to a state of a real time clock generator that includes the real time clock generator counter.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device having a power supply monitoring capabilities, the device comprises:
   a power supply unit;
   at least one real time clock generator counter adapted to receive a supply voltage from the power supply unit;
   a fixed value storage circuit that is un-accessible to software executed by a processor, wherein the fixed value storage circuit stores a fixed value, wherein the fixed value includes multiple bits;
   a volatile storage unit, being accessible to the processor, wherein the volatile storage unit is adapted to:
      receive the fixed value during an initialization state of the device;
      store the fixed value as a value at the volatile storage unit in response to receiving the fixed value; and
      writing a first value as the value at the volatile storage unit in response to the volatile storage unit being reset, wherein the first value is different than a reset value of the volatile storage unit;
      wherein the volatile storage unit is designed such that there is a low probability that the first value equals the fixed value; and
   a comparator adapted to provide a tamper indication if the fixed value stored at the fixed value storage circuit differs from the value stored at the volatile storage unit.

2. The device according to claim 1 wherein the comparator is further responsive to a state of a real time clock generator that comprises the real time clock generator counter.

3. The device according to claim 2 further comprising a one time programmable array adapted to determine a security mode of the at least one real time clock generator.

4. The device according to claim 2 wherein the fixed value is written to the volatile storage unit if a security condition is fulfilled, and wherein one security mode of the real time clock generator differs from another security mode of the real time clock generator by their associated security conditions.

5. The device according to claim 1 further comprising a one time programmable array adapted to determine a security mode of the at least one real time clock generator.

6. The device according to claim 1 wherein the fixed value is written to the volatile storage unit if a security condition is fulfilled, and wherein one security mode of the real time clock generator differs from another security mode of the at least one real time clock generator by their associated security conditions.

7. The device according to claim 1 wherein the fixed value is written to the volatile storage unit only once during a lifetime of the device.

8. The device according to claim 1 wherein the volatile storage unit receives a supply voltage during idle mode of the processor.

9. The device according to claim 1 wherein the volatile storage unit constantly receives a supply voltage until both a primary battery and a secondary battery of the power supply unit are empty.

10. The device of claim 1 further comprising:
an one time programmable switch array coupled between the fixed value storage circuit and the volatile storage unit, the one time programmable switch array including a fuse that is burned after the fixed value is stored in the volatile storage unit to disconnect the volatile storage unit from the fixed value storage circuit.

11. The device of claim 1 wherein the value of the volatile storage unit remains at a same value during a power on reset of the device.

12. A method for power supply monitoring, the method comprises:
providing a supply voltage to a real time clock generator counter;
storing a fixed value at a fixed value storage circuit that is un-accessible to software executed by a processor; wherein the fixed value includes multiple bits;
providing the fixed value to a volatile storage unit during an initialization stage of a device; wherein the volatile storage unit is accessible to the processor;
storing the fixed value as a value at the volatile storage unit in response to providing the fixed value to the volatile storage unit;
writing a first value as the value stored at the volatile storage unit in response to the volatile storage unit being reset, wherein the first value is different than a reset value of the volatile storage unit, and wherein the volatile storage unit is designed such that there is a low probability that the first value equals the fixed value; and
generating a tamper indication if the fixed value stored at the fixed value storage circuit differs from the value stored at the volatile storage unit.

13. The method according to claim 12 wherein the generating comprises comparing between the fixed value stored at the fixed value storage circuit and the value stored at the volatile storage unit, wherein the comparing is further responsive to a state of a real time clock generator that comprises the real time clock generator counter.

14. The method according to claim 12 further comprising determining a security mode of a real time clock generator in response to a control value stored at a one time programmable array.

15. The method according to claim 12 wherein the step of providing, to a volatile memory array, the fixed value is responsive to a fulfillment of a security condition; and wherein one security mode of a real time clock generator differs from another security mode of the real time clock generator by their associated security conditions.

16. The method according to claim 12 the step of providing to a volatile memory array, the fixed value is executed only once during a lifetime of the device.

17. The method according to claim 12 wherein the step of providing a supply voltage comprises providing a supply voltage to the volatile storage unit during idle mode of the processor.

18. The method according to claim 12 wherein the step of providing a supply voltage comprises providing a supply voltage to the volatile storage unit comprises constantly providing a supply voltage until both a primary battery and a secondary battery of a power supply unit are emptied.

19. The method of claim 12 further comprising:
burning a fuse of an one time programmable switch array after the fixed value is stored in the volatile storage unit to disconnect the volatile storage unit from the fixed value storage circuit.

20. The method of claim 12 further comprising:
maintaining the value of the volatile storage unit at a same value during a power on reset of the device.

* * * * *